(12) United States Patent
Richter et al.

(10) Patent No.: US 6,630,645 B2
(45) Date of Patent: Oct. 7, 2003

(54) METHOD FOR PRODUCING AN OPENING IN A METALLIC STRUCTURAL PART

(75) Inventors: Karl-Hermann Richter, Markt Indersdorf (DE); Peter Hildebrand, Peronten (DE); Michael Kuhl, Fuessen (DE); Martin Reisacher, Kempten (DE)

(73) Assignees: MTU Aero Engines GmbH, Munich (DE); Lasertec GmbH, Pfronten (DE)

( * ) Notice: Subject to any disclaimer, the term of this patent is extended or adjusted under 35 U.S.C. 154(b) by 0 days.

(21) Appl. No.: 10/149,720

(22) PCT Filed: Dec. 13, 2000

(86) PCT No.: PCT/DE00/04422
§ 371 (c)(1),
(2), (4) Date: Nov. 25, 2002

(87) PCT Pub. No.: WO01/43912
PCT Pub. Date: Jun. 21, 2001

(65) Prior Publication Data
US 2003/0127438 A1 Jul. 10, 2003

(51) Int. Cl.⁷ .............................................. B23K 26/38
(52) U.S. Cl. ................................................. 219/121.71
(58) Field of Search ....................... 219/121.6, 121.67, 219/121.7, 121.71, 121.72, 121.85

(56) References Cited

U.S. PATENT DOCUMENTS

| | | | |
|---|---|---|---|
| 4,169,976 A | * | 10/1979 | Cirri |
| 5,609,779 A | | 3/1997 | Crow et al. |
| 6,507,002 B1 | * | 1/2003 | Koide |

FOREIGN PATENT DOCUMENTS

| | | |
|---|---|---|
| EP | 0950463 | 10/1999 |
| FR | 2126869 | 10/1972 |
| JP | 11224865 | 8/1999 |

OTHER PUBLICATIONS

S. Nolte, et al., "Microstructuring with femtosecond lasers" LaserOpto, 31(3)/1999 with English abstract.
Copy of Search Report.

* cited by examiner

Primary Examiner—Samuel M. Heinrich
(74) Attorney, Agent, or Firm—Crowell & Moring LLP

(57) ABSTRACT

The invention relates to a method of producing an aperture in a metallic component, in which the aperture comprises, at least in certain portions, a non-cylindrically formed funnel, extends from a first surface to a second surface of a component wall and is formed by a laser beam. The invention improves the dimensional accuracy and reduces the roughness of the surface of the aperture and/or funnel in that, by appropriate choice of the laser parameters, the metal is predominantly removed by sublimation during the formation of the funnel and the funnel is formed by laser removal of layers of a substantially constant thickness.

20 Claims, 2 Drawing Sheets

METHOD FOR PRODUCING AN OPENING IN A METALLIC STRUCTURAL PART

This application claims the priority of German Patent Document No. 199 60 797.4, filed Dec. 16, 1999, and PCT International Application No. PCT/DE00/04422, filed Dec. 13, 2000, the disclosures of which are expressly incorporated by reference herein.

BACKGROUND AND SUMMARY OF THE INVENTION

The invention relates to a method of producing an aperture in a metallic component, in which the aperture comprises, at least in certain portions, a non-cylindrically formed funnel, extends from a first surface to a second surface of the component and is formed by a laser beam.

EP-A-0950463 discloses a method of forming a cooling hole comprising a diffuser portion, in which the diffuser portion is cut out by a beam-drilling method in such a way that the drilling beam remains within a previously selected cross-sectional area.

It is known from S. NOLTE, G. KAMLAGE: 'Mikrostrukturierung mit Femtosekundenlasern' [Microstructuring with femtosecond lasers], LASEROPTO, Vol. 31, No. 3 Apr. 15, 1999 (1999-04-15), pages 72–76, XP000999012, that, during laser machining, an increasingly shorter pulse duration and a reduction in the ambient pressure assist the sublimation of the material and lead to an improved workpiece surface. In particular during laser-beam drilling, the striation of the hole and the drilling core can be improved by a reduction in the ambient pressure and by special process gases, such as helium.

U.S. Pat. No. 5,609,779 discloses a method of laser drilling non-circular apertures in a metallic component, in which the aperture comprises a diffuser which extends up to one surface of the component and is formed by vaporizing the metal by means of a laser, the laser beam traversing the surface from a center line of the diffuser transversely to both sides at a respectively increasing rate and with overlapping laser spots, to allow non-circular apertures to be produced with a conventional laser as inexpensively as possible and with a relatively good surface. The increasing rate and the overlapping are intended to compensate for tolerances in the pulse energy which lead to varying material removal, and at the same time produce the specific, cross-sectionally non-circular form of the diffuser.

In this operation, it has proven to be problematical that the metal becomes liquid due to the pulse frequency and pulse duration used, which has adverse effects on the surface of the diffuser. Owing to the laser machining at an increasing rate, the thickness of the layers varies and decreases from the center line outwards, whereby cumulative inaccuracies with regard to the form of the diffuser may occur, in particular in the case of a number of successive layers.

The object of the present invention is to provide a method of the generic type described at the beginning with which apertures can be formed with the best possible surface and dimensional accuracy.

The solution to the problem is characterized according to the invention in that, by choice of the laser parameters, such as for example the pulse frequency, pulse energy or pulse duration, the metallic material is predominantly removed by sublimation, at least during the formation of the funnel, and the funnel is formed by laser removal of layers of a substantially constant thickness.

It is advantageous in the case of material removal by sublimation, as a result of the high energy input per pulse, that undefined deposits of viscous material in the region of the aperture or the funnel to be removed, which lead to increased roughness, are avoided. The defined removal in layers of substantially constant thickness ensures high dimensional accuracy with low roughness of the surface of the aperture and/or of the funnel. The method can be carried out efficiently from technical production-related aspects. Final finishing of the surface of the aperture or the funnel formed in this way is not required, saving time and costs in the production process.

During the removal of the layer, the laser beam can be moved at a constant rate in relation to the respective surface, beginning with an outer surface, of the component, in order in this way to achieve a defined removal of layers of substantially constant thickness. The relative movement between the laser beam and the component to be machined is generally produced by moving the component, which is clamped in a device of a suitable machine tool. Similarly, this can be achieved by a generally more restricted movement of the laser or a superimposed movement.

Suitable laser parameters allow layers of substantially constant thickness of from 1 $\mu$m to 10 $\mu$m to be removed. The form and dimensions of the successively removed layers can be adapted to the form of the funnel, whereby the apertures can be produced economically without any finishing. The form of the funnel is substantially described by a first aperture angle, determining a height H of the funnel, and a second aperture angle, determining a width B. The funnel may alternatively also be conically formed with a circular cross section.

For removing the layers, a laser beam can be moved in a number of neighboring, generally parallel, paths over the respective surface of the component, the removal beginning at an outer surface of the metallic component and taking place, for example, line by line for each layer. An overlapping of the individual paths is not required and is avoided to carry out the method as efficiently as possible.

To realize layers of substantially constant thickness, the laser beam can move along the individual paths at a constant rate.

The laser removal can be carried out at a pulse frequency of from 1 to 50 kHz, in order to remove the material predominantly by sublimation during the forming of the aperture and/or the funnel. For this purpose, as much energy per pulse as possible must be introduced into the region to be removed over an extremely short period of time. To realize the extremely short period of time, the laser removal can be carried out with a pulse duration of from 10 to 1000 ns and a pulse energy of 0.005 to 1 Joule per pulse, these laser parameters allowing pulse peak outputs in the range from 50 kW to 1 MW to be achieved.

Before or after the forming of the funnel, a cross-sectionally substantially circular or cylindrical (aperture) portion of the aperture can be formed by laser drilling, so that the aperture comprises a non-cylindrically formed funnel and a substantially cylindrically formed (aperture) portion. During the laser drilling of the cylindrical (aperture) portion, the laser beam is aligned in the direction of the center axis of the aperture, generally running at an acute angle in relation to the surface of the component.

During the removal of the layer, the laser beam can move spirally over the respective surface of the component, it being possible for the relative movement to begin at the center, where the center axis of the aperture intersects the outer surface of the component, or at the outer circumference of the funnel.

Further exemplary embodiments of the invention are described.

BRIEF DESCRIPTION OF THE DRAWINGS

The invention is explained in more detail below on the basis of exemplary embodiments with reference to a drawing, in which.

DETAILED DESCRIPTION OF THE DRAWINGS

Figure 1:
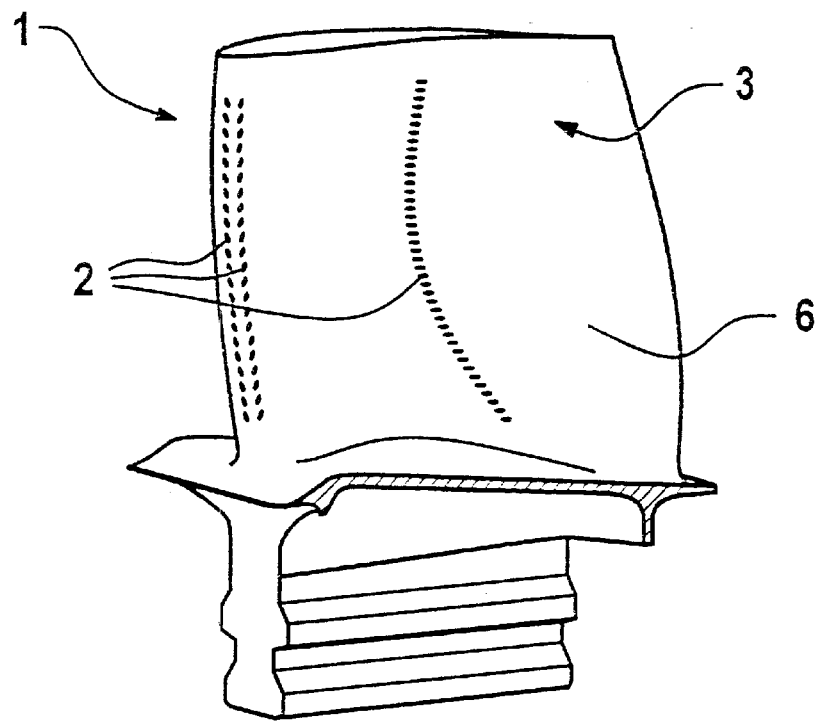
FIG. 1 shows in a perspective representation a turbine blade of a gas turbine with apertures formed as cooling-air holes, which are produced according to a refinement of the method according to the invention.

FIG. 1 shows as a metallic component a turbine blade 1 of a gas turbine, such as for example an aircraft engine, in a perspective representation, in which numerous apertures 2, formed as cooling-air holes, are formed by the method according to the invention. The cooling-air holes 2 generally run at an acute angle 4, shown in FIG. 2, through the component wall 3, which angle usually lies in the range from 12° to 350° in relation to an outer surface 6 of the component 1 and is, for example, 30°. From a cavity in the turbine blade 1, compressor air is passed through the cooling-air holes 2, in order to direct a film of cooling air over the outer surface 5 of the turbine blade 1.

The turbine blade 1 consists of a metal, such as for example an Ni- or Co-based alloy, and, for producing the apertures 2, is clamped in a suitable machine tool, in which it can be moved or turned along a number of axes. The relative movement between a laser with which the forming of the aperture 2 is performed by laser removal and the component 1 to be machined is generally produced by moving the component 1. Similarly, this can be achieved by a generally more restricted movement of the laser or a superimposed movement.

Figure 2:
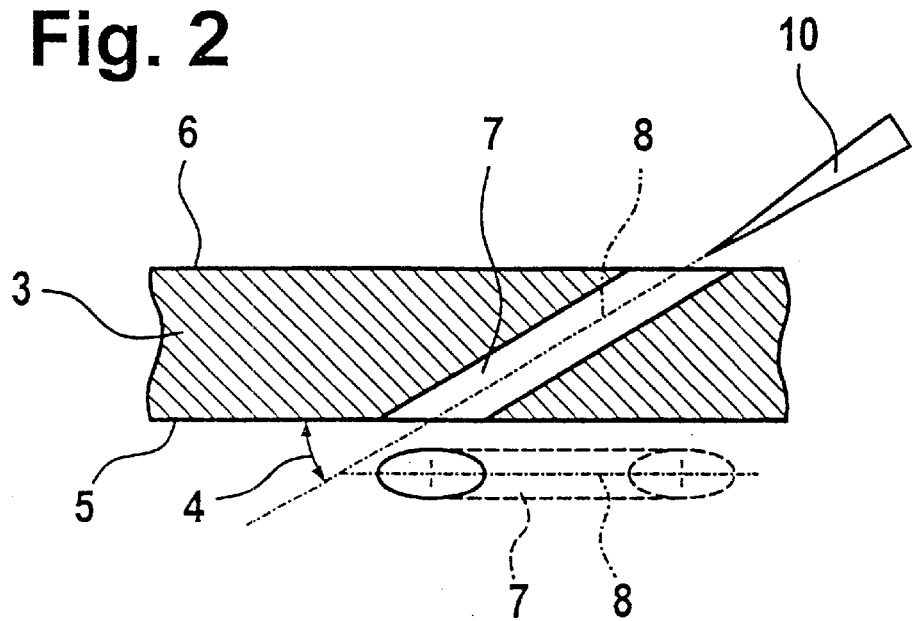
FIG. 2 shows a cross-sectional view through a component wall in which a cylindrical aperture portion produced in a first step according to a refinement of the method according to the invention is represented.

FIG. 2 shows a sectioned view of the component wall 3 of the turbine blade 1, in which an aperture portion 7 produced in a first step according to an exemplary embodiment of the method according to the invention, having a substantially circular cross section, is represented. The center axis 8 of this cylindrical aperture portion 7 runs at an acute angle 4 of approximately 30° through the component wall 3. As a consequence of this, in the plan view indicated merely by dashed lines, the circular cross section is represented in an elongated form in the inner, first surface 5 and the outer, second surface 6.

The apertures 2 produced by the method according to the invention are through-apertures and extend from the inner, first surface 5 to the outer, second surface 6 of the component wall 3. Before the forming of a cross-sectionally non-circular funnel 9, shown in FIG. 3, firstly, in a first step, the aperture portion 7 of circular cross section is formed by means of laser drilling. For this purpose, a schematically indicated laser beam 10 of an Nd-YAG laser is used and directed onto the outer, second surface 6 of the component wall 3 in the direction of the center axis 8 of the aperture portion 7 to be drilled. The laser parameters, such as the pulse duration and pulse energy, as well as the number of pulses, are chosen according to the thickness of the component wall 3.

Figure 3:
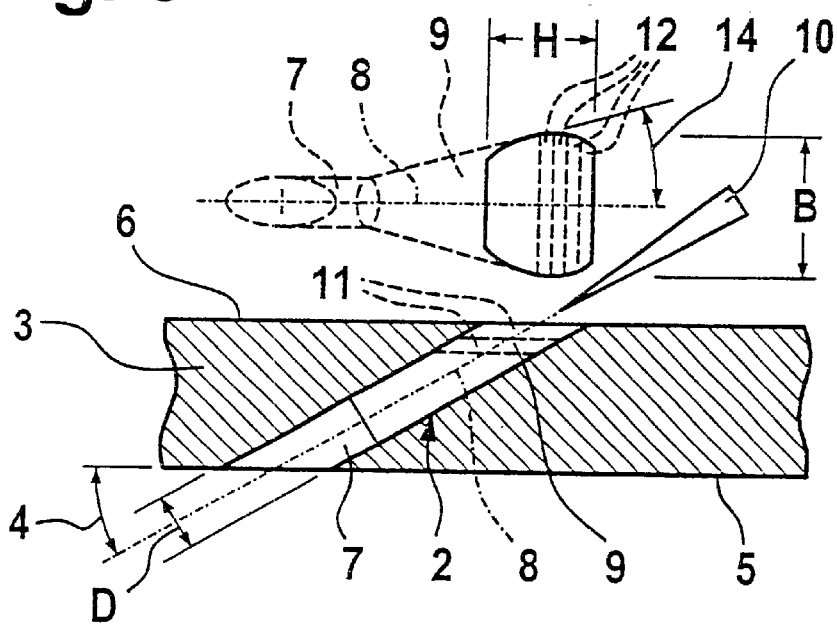
FIG. 3 shows a cross-sectional view through a component wall in which an aperture produced according to a refinement of the method according to the invention is represented and FIG. 4 shows a cross-sectional view through a component wall in which another aperture produced according to an alternative refinement of the method according to the invention is represented.

In the case of an exemplary embodiment of the method according to the invention, then, in a second step, the non-cylindrical funnel 9, represented in FIG. 3, is formed, respectively comprised by the cooling-air holes 2 for reasons of flow dynamics, in order to increase the pressure of the air flowing through. For this purpose, by suitable choice of the laser parameters, the metallic material is sublimated during the laser removal, beginning from the outer, second surface 6, so that the metal substantially does not go into the liquid phase and no viscous material can be deposited in the region to be removed, thereby impairing the quality of the surface.

The forming of the funnel 9 takes place by substantially parallel layers 11, which in FIG. 3 are indicated schematically by dashed lines and greatly enlarged, being removed with respect to the outer, second surface 6. The laser removal takes place with a multiplicity of pulses of the laser beam 10, the pulse energy being adapted to the thickness of the layers 11 to be removed. Depending on the desired form of the funnel 9, the second aperture angle 14 of which, determining a width B, can vary in relation to the center axis 8 and is, for example, approximately 15°, the thickness of the layers 11 lies between 1 $\mu$m and 10 $\mu$m The material of the individual layers 11 is respectively removed by laser in paths 12 indicated by dashed lines and greatly enlarged, in which the laser beam 10 moves line by line in relation to the surface 6 of the component 1. The movement along the paths 12 takes place at a constant rate. The paths 12 respectively extend over the entire width B or, in the case of another alignment, the entire height H of the funnel 9.

To ensure the sublimation of the metallic material of the component 1, a high pulse energy must be introduced by the laser beam 10 into the region to be removed with an extremely short pulse duration. For this purpose, the Nd-YAG laser is equipped with a Q-switch, and a pulse energy of from 5 to 100 mJoules per pulse, with a pulse duration of from 10 to 1000 ns, is chosen. Alternatively, along with the Nd-YAG drilling laser, a separate Q-switch Nd-YAG laser can be used.

In the plan view indicated by dashed lines in FIG. 3 of the outer, second surface 6 of the component wall 3, it can be seen that the dimensions of the funnel 9 are chosen such that a height H resulting from a first aperture angle 13 is smaller than the width B of the funnel 9. In the case of the present exemplary embodiment, the height H corresponds to the diameter D of the aperture portion 7. The funnel 9 has the same center axis 8 as the aperture portion 7 and consequently runs coaxially in relation to the latter. The funnel 9 and the cylindrical aperture portion 7 together form the aperture 2.

Figure 4:
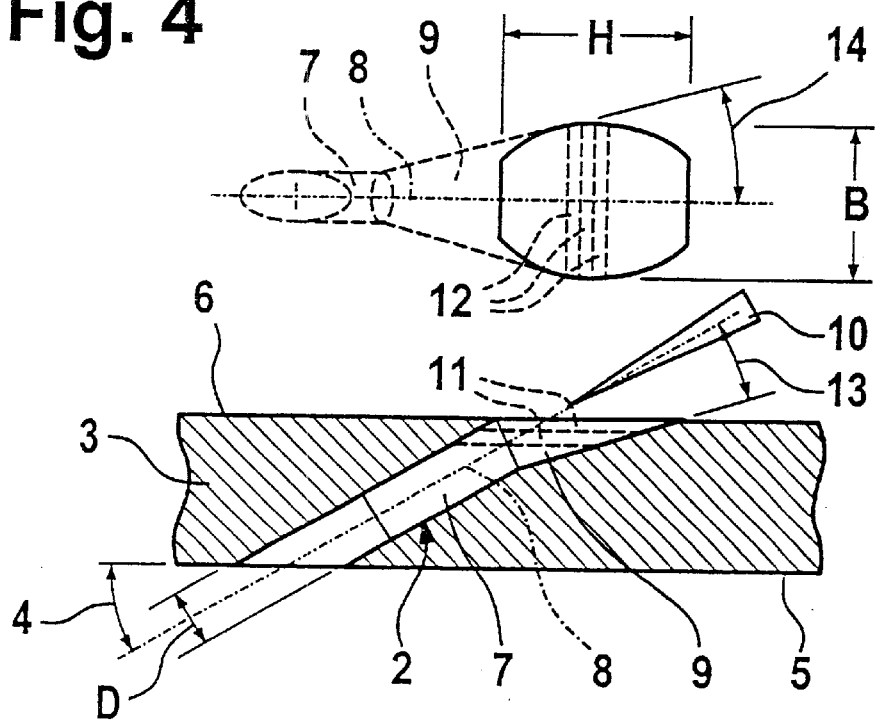

FIG. 4 shows in a cross-sectional view another aperture 2, formed as a cooling-air hole, which is produced by an alternative refinement of the method according to the invention. It is also the case with this cooling-air hole 2 that, firstly, an aperture portion 7 of substantially circular cross section is formed by laser drilling at an acute angle 4 of approximately 30° in relation to the outer, second surface 6 of the component wall 3 of the turbine blade 1. The laser beam 10 of the Nd-YAG laser is in this case aligned in the direction of the center axis 8 of the aperture portion 7.

In a second step, the funnel 9 is then formed by laser removal, beginning from the outer, second surface 6 of the component wall 3. In this case, the Nd-YAG laser is equipped with a Q-switch and, by appropriate choice of the laser parameters, is capable of sublimating virtually completely the metallic material to be removed for the forming of the funnel 9. Alternatively, for the second step, a separate Q-switch Nd-YAG laser can be used along with the Nd-YAG drilling laser used in the first step. In order to introduce into the material to be removed the pulse peak output required for this purpose, in the range from 50 kW to 1 MW, a pulse energy of from 0.005 to 0.1 Joule per pulse and a pulse duration of 10 to 1000 ns are provided.

The thickness of the respective layer 11 is chosen according to the form of the funnel 9. This thickness generally lies in the range from 1 $\mu$m to 10 $\mu$m. In the plan view indicated by dashed lines in FIG. 4, it can be seen that a width B of the funnel 9 extends substantially symmetrically in relation to the center axis 8 of the aperture 2. The height H of the funnel 9 extends asymmetrically in relation to the center axis 8, since, as can be seen well in the cross-sectional view of FIG. 4, the first aperture angle 13 in relation to the center axis 8 towards one side is large and is approximately 16°. As a result, the funnel 9 deviates away from the center axis 8 of the aperture 2 more strongly on one side.

The layers 11 are respectively removed in the paths 12 indicated by dashed lines, in which the laser beam 10 moves at a constant rate in relation to the component 1. The thickness of the layers 11 is adapted in each exemplary embodiment of the method according to the invention to the form of the funnel 9, which is substantially described by the first aperture angle 13, determining the height H, and the second aperture angle 14, determining the width B. The funnel 9 may also be formed conically with a circular cross section.

In all the refinements of the method according to the invention, the funnel 9 may be initially produced at the outer, second surface 6 of the component wall 3 by laser removal by means of an Nd-YAG laser equipped with a Q-switch and, following that, in a second step, the aperture portion 7 of substantially circular cross section may be produced by laser drilling with an Nd-YAG laser, the funnel 9 and the cylindrical aperture portion 7 here again having a common centre axis 8. The form of the funnel 9 may be symmetrical or asymmetrical in relation to the center axis 8, depending on the requirement, as a result of the choice of the aperture angle 13 and its dimensions H and B.

In a further refinement of the method according to the invention, the material of the individual layers 11 may be removed by the laser beam 10 moving spirally around the center axis 8 of the aperture 2 in relation to the outer surface 6 of the metallic component 1.

What is claimed is:

1. A method of producing an aperture in a metallic component, in which the aperture comprises, at least in certain portions, a non-cylindrically formed funnel, extends from a first surface to a second surface of a metal component wall and is formed by a laser beam, wherein, by choice of laser parameters, the metal is predominantly removed by sublimation during the formation of the funnel and the funnel is formed by laser removal of layers of a substantially constant thickness, and wherein, during the removal of the layers, a laser beam moves in a number of neighboring paths, adapted in length and number to a form of the funnel, over a respective surface of the component.

2. The method according to claim 1, wherein, during the removal of the layers, the laser beam moves at a constant rate in relation to the respective surface of the component wall.

3. The method according to claim 1, wherein the layers are removed with a substantially constant thickness of from 1 $\mu$m to 10 $\mu$m.

4. The method according to claim 1 wherein a form and dimensions of the layers are adapted to the form of the funnel.

5. The method according to claim 1, wherein the laser beam moves along the neighboring paths at a constant rate.

6. The method according to claim 1, wherein the laser removal is carried out at a pulse frequency of from 1 to 50 kHz.

7. The method according to claim 1, wherein the laser removal is carried out with a pulse duration of from 10 ns to 1000 ns.

8. The method according to claim 1, wherein the laser removal is carried out with pulse peak outputs in the range from 50 kW to 1 MW.

9. The method according to claim 1, wherein before or after the forming of the funnel, a cross-sectionally circular portion of the aperture is formed by laser drilling.

10. The method according to claim 1, wherein during removal of the layers, the laser beam is moved in a spiral path.

11. A method of producing an aperture including a non-cylindrical funnel in a metallic component, comprising the steps of:

forming the funnel by removing metal layers of a substantially constant thickness from a surface of the component by sublimation by moving a laser beam along a number of adjacent paths, the paths defined in length and quantity in relation to a desired form of the funnel.

12. The method of claim 11, wherein during removal of the metal layers, the laser beam moves at a constant rate in relation to the surface of the component.

13. The method of claim 11, wherein the metal layers are removed with a substantially constant thickness of from 1 $\mu$m to 10 $\mu$m.

14. The method of claim 11, wherein a form and dimension of the metal layers are adapted to the desired form of the funnel.

15. The method according to claim 11, wherein the laser beam moves along the neighboring paths at a constant rate.

16. The method according to claim 11, wherein the laser removal is carried out at a pulse frequency of from 1 to 50 kHz.

17. The method according to claim 11, wherein the laser removal is carried out with a pulse duration of from 10 ns to 1000 ns.

18. The method according to claim 11, wherein the laser removal is carried out with pulse peak outputs in the range from 50 kW to 1 MW.

19. The method according to claim 11, wherein before or after the forming of the funnel, a cross-sectionally circular portion of the aperture is formed by laser drilling.

20. The method according to claim 11, wherein during removal of the layers, the laser beam is moved in a spiral path.

* * * * *

(12) INTER PARTES REEXAMINATION CERTIFICATE (0242nd)
United States Patent
Richter et al.

(10) Number: US 6,630,645 C1
(45) Certificate Issued: Mar. 8, 2011

(54) METHOD FOR PRODUCING AN OPENING IN A METALLIC STRUCTURAL PART

(75) Inventors: Karl-Hermann Richter, Markt Indersdorf (DE); Peter Hildebrand, Peronten (DE); Michael Kuhl, Fuessen (DE); Martin Reisacher, Kempten (DE)

(73) Assignees: MTU Aero Engines GmbH, Munich (DE); Lasertec GmbH, Pfronten (DE)

Reexamination Request:
No. 95/000,272, Jun. 27, 2007

Reexamination Certificate for:
Patent No.: 6,630,645
Issued: Oct. 7, 2003
Appl. No.: 10/149,720
Filed: Nov. 25, 2002

(22) PCT Filed: Dec. 13, 2000
(86) PCT No.: PCT/DE00/04422
§ 371 (c)(1),
(2), (4) Date: Nov. 25, 2002
(87) PCT Pub. No.: WO01/43912
PCT Pub. Date: Jun. 21, 2001

(51) Int. Cl.
*B23K 26/00* (2006.01)
*B23K 26/38* (2006.01)
*F01D 5/18* (2006.01)

(52) U.S. Cl. .................................. 219/121.71
(58) Field of Classification Search .................. None
See application file for complete search history.

(56) References Cited

U.S. PATENT DOCUMENTS

| | | |
|---|---|---|
| 3,894,208 A | 7/1975 | Bergmann |
| 4,114,018 A | 9/1978 | Von Allmen et al. |
| 4,169,976 A | 10/1979 | Cirri |
| 4,737,613 A | 4/1988 | Frye |
| 4,762,464 A | 8/1988 | Vertz et al. |
| 4,857,698 A | 8/1989 | Perun |
| 4,873,414 A | 10/1989 | Ma et al. |
| 5,073,694 A | 12/1991 | Tessier et al. |
| 5,223,692 A | 6/1993 | Lozier et al. |
| 5,376,770 A | 12/1994 | Kuhl et al. |
| 5,539,175 A | 7/1996 | Smith et al. |
| 5,593,606 A | 1/1997 | Owen et al. |
| 5,609,779 A | 3/1997 | Crow et al. |
| 5,683,600 A | 11/1997 | Kelley et al. |
| 5,744,780 A | 4/1998 | Chang et al. |
| 5,747,769 A | 5/1998 | Rockstroh et al. |
| 5,780,807 A | 7/1998 | Saunders |
| 5,837,964 A | 11/1998 | Emer et al. |

(Continued)

FOREIGN PATENT DOCUMENTS

| | | |
|---|---|---|
| EP | 1 246 711 B1 | 10/2002 |
| JP | 2 133189 | 5/1990 |
| JP | 11224865 | 8/1999 |

OTHER PUBLICATIONS

Wang et al., "The research and development of Nd: YAG laser engraving system"SPIE, vol. 2888, Sep. 1996, pp. 207–212.

(Continued)

*Primary Examiner*—Terrence R Till

(57) ABSTRACT

The invention relates to a method of producing an aperture in a metallic component, in which the aperture comprises, at least in certain portions, a non-cylindrically formed funnel, extends from a first surface to a second surface of a component wall and is formed by a laser beam. The invention improves the dimensional accuracy and reduces the roughness of the surface of the aperture and/or funnel in that, by appropriate choice of the laser parameters, the metal is predominantly removed by sublimation during the formation of the funnel and the funnel is formed by laser removal of layers of a substantially constant thickness.

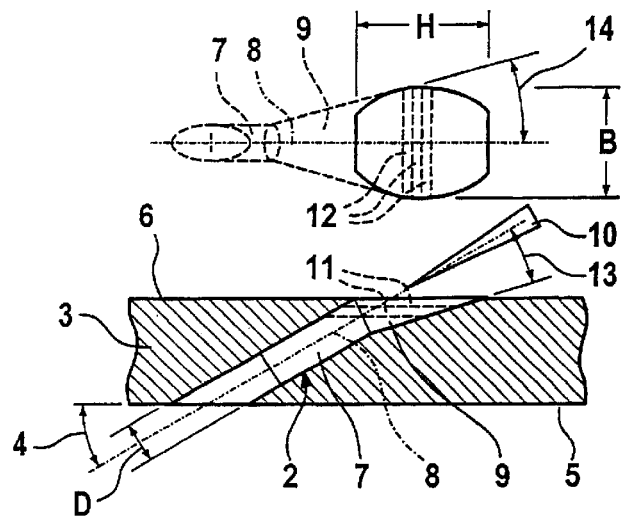

U.S. PATENT DOCUMENTS

| | | | |
|---|---|---|---|
| 6,054,673 | A | 4/2000 | Chen |
| 6,172,331 | B1 | 1/2001 | Chen |
| 6,307,175 | B1 | 10/2001 | Blöchlinger et al. |
| 6,359,254 | B1 | 3/2002 | Brown |
| 6,365,871 | B1 | 4/2002 | Knowles et al. |
| 6,441,341 | B1 | 8/2002 | Steibel et al. |
| 6,573,474 | B1 | 6/2003 | Loringer |
| 6,621,040 | B1 | 9/2003 | Perry et al. |

OTHER PUBLICATIONS

Hellrung et al., "Laser beam removal of micro-structures with Nd:YAG-Lasers", SPIE, vol. 3097, Aug. 1997, pp. 267-273.

Kleijhorst et al., "Micro-machining workstation for a diode pumped Nd:YAG high-brightness laser system," Review of Scientific Instruments, vol. 69, No. 5, May 1998, pp. 2118-2119.

Nolte et al., "Microstructuring with femtosecond lasers", LaserOpto, vol. 31, No. 3, Apr. 15, 1999, pp. 72-76.

Ramos et al., "Laser micromachining of metals", SPIE, vol. 3822, Sep. 1999, pp. 207-213.

Holthaus et al., "Pioneering Lasers for Rapid Tooling Using laser powers to machine molds and dies", Manufacturing Engineering, vol. 128, No. 1, Jan. 2002, pp. 1-3.

Kulina, [u.a.]: Materialbearbeitung durch Laserstrahl. Fachbuchreihe Schweisstechnik, Bd. 119. ISBN 3-87155-137-6 Düsseldorf, DVS-Verlag GmbH, 1993, Kapitel 3.2.4 S.8, 2 pages (w/English Translation).

P.W. French, et al., Investigation of the Nd:YAG laser percussion drilling process using high speed filming, 1998, pp. 1-10, Laser Group, Department of Mechnical Engineering. The University of Liverpool, PO Box 147, Liverpool L69 3 BX UK.

Bostanjoglo et al., "Processing of Ni-based aero engine components with repetitively Q-switched Nd:YAG-lasers", International Society for Optical Engineering (SPIE), Sep. 1996, vol. 2789, pp. 145-157.

Gillner et al., "Micro-structuring with Nd:YAG-Lasers", Proceedings of the Institute for Manufacturing Technology, Laser Assisted Net shape Engineering (LANE), 1997, pp. 561-569.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-20 are cancelled.

\* \* \* \* \*